United States Patent
Naseer-Ul-Islam et al.

(10) Patent No.: US 12,490,154 B2
(45) Date of Patent: Dec. 2, 2025

(54) SURVIVAL TIME DEPENDENT FLEXIBLE HANDOVER EXECUTION

(71) Applicant: Nokia Technologies Oy, Espoo (FI)

(72) Inventors: Muhammad Naseer-Ul-Islam, Munich (DE); Ömer Bulakci, Munich (DE); Ahmad Awada, Munich (DE); Jedrzej Stanczak, Wroclaw (PL); Srinivasan Selvaganapathy, Bangalore (IN); Amaanat Ali, Espoo (FI); Rakash Sivasiva Ganesan, Munich (DE); Janne Ali-Tolppa, Espoo (FI)

(73) Assignee: Nokia Technologies Oy, Espoo (FI)

( * ) Notice: Subject to any disclaimer, the term of this patent is extended or adjusted under 35 U.S.C. 154(b) by 321 days.

(21) Appl. No.: 18/263,070

(22) PCT Filed: Jan. 27, 2022

(86) PCT No.: PCT/FI2022/050052
§ 371 (c)(1),
(2) Date: Jul. 26, 2023

(87) PCT Pub. No.: WO2022/167721
PCT Pub. Date: Aug. 11, 2022

(65) Prior Publication Data
US 2024/0107399 A1  Mar. 28, 2024

(30) Foreign Application Priority Data

Feb. 3, 2021 (IN) .............................. 202141004663
Aug. 4, 2021 (IN) .............................. 202144035158

(51) Int. Cl.
H04W 36/00 (2009.01)
H04W 36/08 (2009.01)
H04W 36/36 (2009.01)

(52) U.S. Cl.
CPC ..... *H04W 36/00837* (2018.08); *H04W 36/08* (2013.01); *H04W 36/36* (2013.01)

(58) Field of Classification Search
CPC .......... H04W 36/00837; H04W 36/36; H04W 36/08; H04W 36/362
See application file for complete search history.

(56) References Cited

U.S. PATENT DOCUMENTS

2016/0302127 A1* 10/2016 Moon ................... H04W 24/04
2020/0059847 A1* 2/2020 Lin .................... H04W 36/0016
(Continued)

FOREIGN PATENT DOCUMENTS

WO  2019/134163 A1  7/2019
WO  2020/150643 A1  7/2020
(Continued)

OTHER PUBLICATIONS

Partial European Search Report received for corresponding European Application No. 22749296.4, dated Dec. 16, 2024, 19 pages.
(Continued)

*Primary Examiner* — Margaret G Webb
(74) *Attorney, Agent, or Firm* — Barta Jones, PLLC

(57) ABSTRACT

Systems, methods, apparatuses, and computer program products for survival time dependent flexible handover execution are provided. One method may include providing, by a network node, at least one handover execution condition to at least one user equipment. The at least one handover execution condition may include one or more delta values with respect to one or more actual handover execution conditions to allow for early and/or late execution of a handover by the at least one user equipment. The method may also include indicating, to the at least one user equip- (Continued)

ment, a transfer interval and/or a survival time information for which the at least one handover execution condition is taken into account.

18 Claims, 12 Drawing Sheets

(56) References Cited

U.S. PATENT DOCUMENTS

| | | | |
|---|---|---|---|
| 2021/0377828 A1* | 12/2021 | Tao | H04W 36/0085 |
| 2022/0116839 A1* | 4/2022 | Tseng | H04W 36/0061 |
| 2022/0191752 A1* | 6/2022 | Rune | H04W 36/00837 |
| 2023/0217329 A1* | 7/2023 | Wallentin | H04W 36/0058 |
| | | | 370/331 |
| 2023/0284077 A1 | 9/2023 | Pateromichelakis | |

FOREIGN PATENT DOCUMENTS

| | | |
|---|---|---|
| WO | 2020/167189 A1 | 8/2020 |
| WO | 2020/204549 A1 | 10/2020 |
| WO | 2020/229552 A1 | 11/2020 |
| WO | 2022/021317 A1 | 2/2022 |

OTHER PUBLICATIONS

"3rd Generation Partnership Project; Technical Specification Group Services and System Aspects; Study on application layer support for Factories of the Future in 5G network; (Release 17)", 3GPP TR 23.745, V1.0.0, Sep. 2020, pp. 1-57.
"Email discussions summary for enhanced IIoT/URLLC for Release 17", 3GPP TSG-RAN#86, RP-192657, Agenda: 9.1.2, Nokia, Dec. 9-12, 2019, pp. 1-63.
Extended European Search Report received for corresponding European Application No. 22749296.4, dated Mar. 10, 2025, 17 pages.
"3rd Generation Partnership Project; Technical Specification Group Radio Access Network; NG-RAN; Xn application protocol (XnAP) (Release 16)", 3GPP TS 38.423, V16.4.0, Jan. 2021, pp. 1-457.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
"Time Synchronization Signalling and Mobility Impact Analysis", 3GPP TSG-RAN WG2 Meeting #113 Electronic, R2-2100716, Agenda: 8.5.2, Nokia, Jan. 25-Feb. 5, 2021, 5 pages.
"3rd Generation Partnership Project; Technical Specification Group Services and System Aspects; Service requirements for cyber-physical control applications in vertical domains; Stage 1 (Release 17)", 3GPP TS 22.104, V17.4.0, Sep. 2020, pp. 1-76.
"3rd Generation Partnership Project; Technical Specification Group Services and System Aspects; Study on enhanced support of Industrial Internet of Things (IIoT) in the 5G System (5GS) (Release 17)", 3GPP TR 23.700-20, V1.3.0, Nov. 2020, pp. 1-88.
"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.
"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.
"Msc-generator", Sourceforge, Retrieved on Aug. 23, 2023, Webpage available at : https://sourceforge.net/projects/msc-generator/.
"3rd Generation Partnership Project; Technical Specification Group Radio Access Network; NR; Requirements for support of radio resource management (Release 17)", 3GPP TS 38.133, V17.0.0, Dec. 2020, 1812 pages.
"3rd Generation Partnership Project; Technical Specification Group Radio Access Network; NR; Physical channels and modulation (Release 16)", 3GPP TS 38.211, V16.4.0, Dec. 2020, pp. 1-133.
"Potential Solutions for Reducing Service Interruption in NR Handover", 3GPP TSG-RAN WG2 Meeting #105, R2-1900609, Agenda: 11.9. 2, Nokia, Feb. 25-Mar. 1, 2019, 5 pages.
"3rd Generation Partnership Project; Technical Specification Group Radio Access Network; Evolved Universal Terrestrial Radio Access (E-UTRA); Requirements for support of radio resource management (Release 17)", 3GPP TS 36.133, V17.0.0, Dec. 2020, 3857 pages.
"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.
International Search Report and Written Opinion received for corresponding Patent Cooperation Treaty Application No. PCT/FI2022/050052, dated Apr. 27, 2022, 12 pages.

* cited by examiner

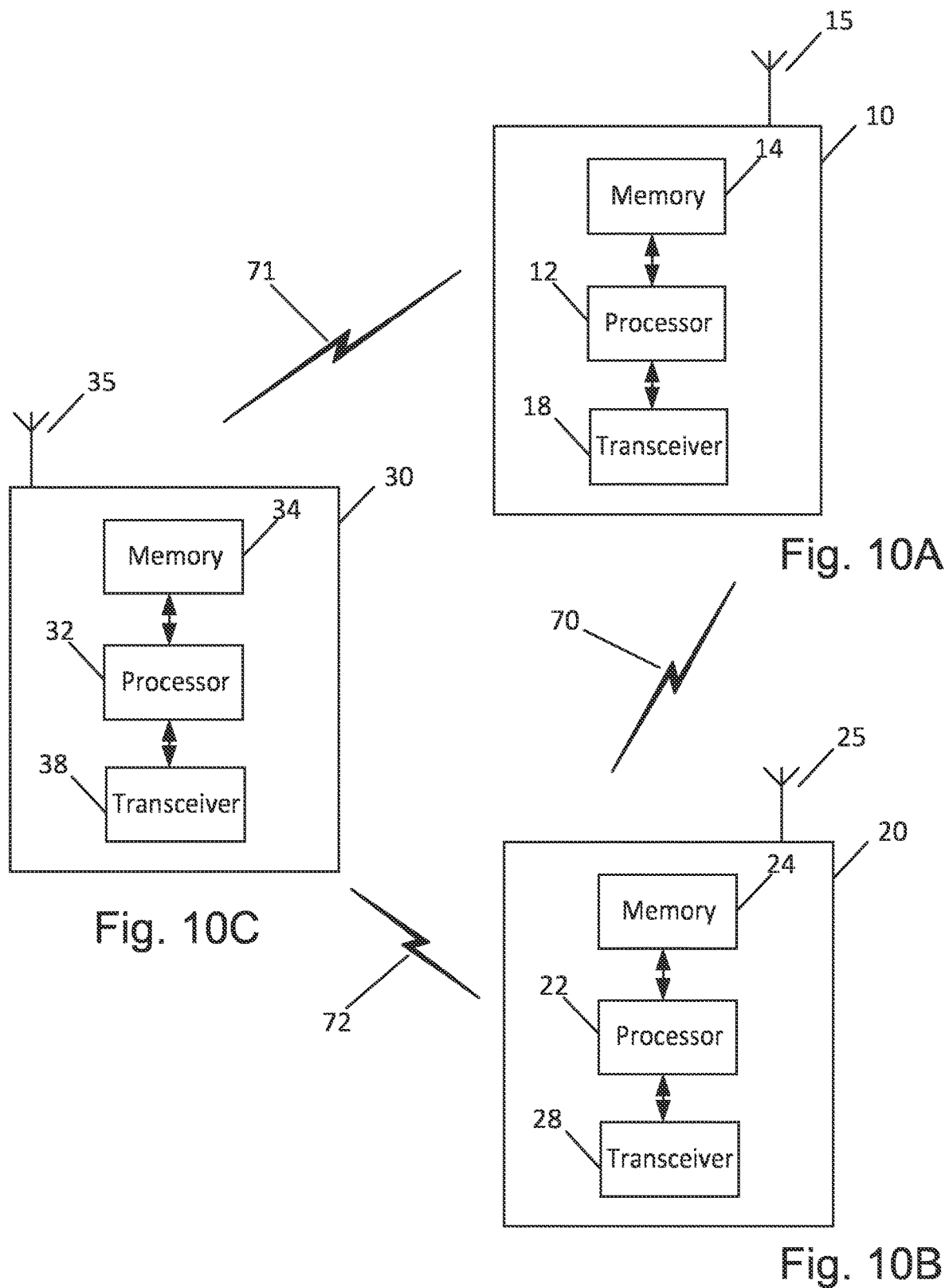

SURVIVAL TIME DEPENDENT FLEXIBLE HANDOVER EXECUTION

RELATED APPLICATION

This application claims priority to PCT Application No. PCT/FI2022/050052, filed Jan. 27, 2022, which claims priority from IN application No. 202141004663, filed on Feb. 3, 2021, and IN application No. 202144035158, filed on Aug. 4, 2021, each of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods of survival time dependent flexible handover (HO) execution.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 10A illustrates an example block diagram of an apparatus, according to an embodiment;

FIG. 10B illustrates an example block diagram of an apparatus, according to an embodiment; and FIG. 10C illustrates an example block diagram of an apparatus, according to an embodiment.

DETAILED DESCRIPTION

Figure 1:
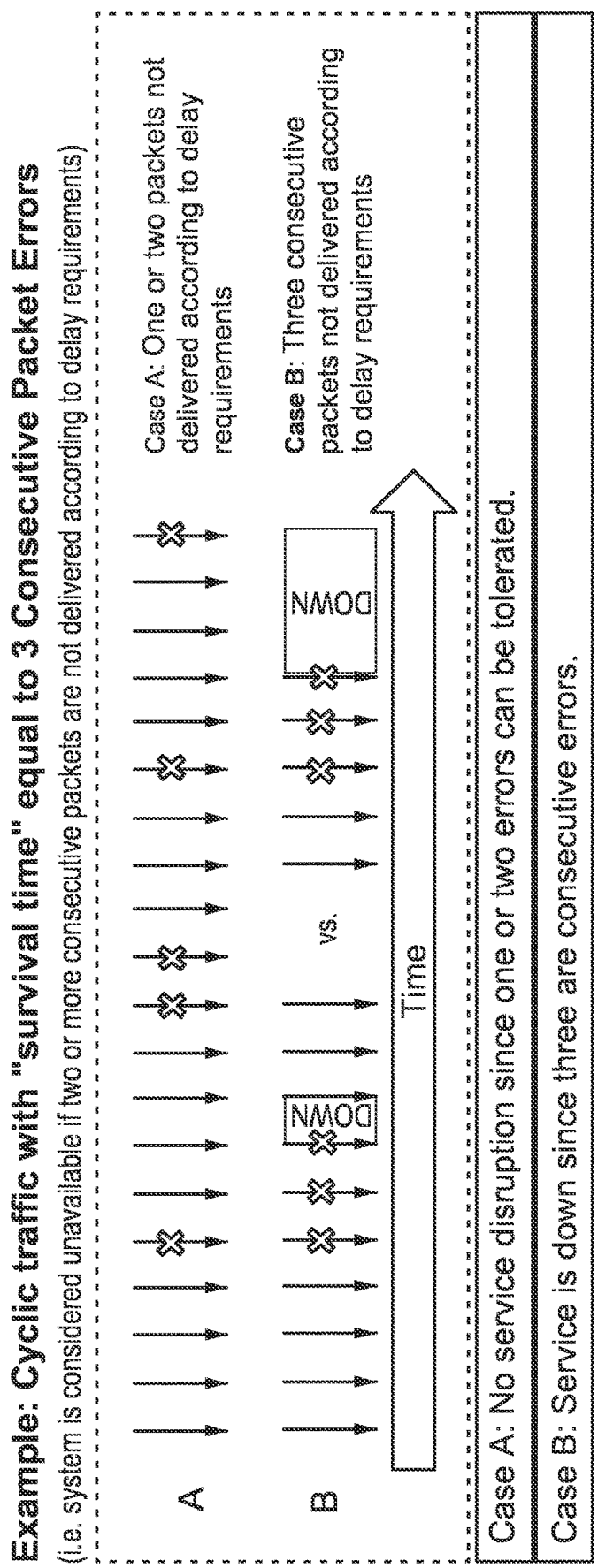
FIG. 1 illustrates a diagram depicting an example of survival time and the tolerance of packet loss within survival time requirements.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for survival time dependent flexible handover execution, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Critical industrial IoT (IIoT) traffic is typically defined with URLLC characteristics, which require very high reliability of sending a packet within a strict delay budget. Nevertheless, various IIoT services can still continue to operate correctly when a few packets are not correctly received. This notion is referred to as the Survival Time (ST) of the service. The maximum ST is defined in 3GPP TS 22.104 as a time period over which the communication service may not meet the application's requirement before there is a failure such that the communication service is deemed to be in an unavailable state. The ST is also referred to as the time that an application consuming a communication service may continue without an anticipated message.

Accordingly, the ST can be inferred as the time or number of continuous packet losses or packets missing the arrival within a required time budget for given traffic flow. Beyond this limit, the receiver of the traffic may, for example, shut down the receiver operation due to safety measures. Hence, successful delivery of the packets before the expiry of the survival time is one main criterion for quality of service (QoS) requirements in the radio access network (RAN).

A 3GPP study item (see, e.g., 3GPP TR 23.700-20) has identified the issue of "Use of Survival Time for Deterministic Applications in 5GS," which studies the inclusion of the ST information in the time sensitive communications (TSC) assistance information (TSCAI) per QoS flow that is provided from the 5G core network (5GC) to the (R)AN. The ST information can be obtained via the application function (AF) and can be provided to the session management function (SMF). The ST can be utilized by RAN to handle the QoS requirements of a service. The ST is service dependent and can vary, e.g., in the order of 2× transfer interval value where the transfer interval may be 5 ms for a cooperative carrying use case. Here, transfer interval is defined as the time difference between two consecutive transfers of application data from an application via the service interface to 3GPP system. Accordingly, the ST may be obtained by (radio) access network (R)AN from core network (CN). Nevertheless, there could be other means of obtaining the ST information, e.g., from a device or user equipment (UE) or configuration, e.g., from a management entity.

FIG. 1 illustrates a diagram depicting an example of survival time and the tolerance of packet loss within survival time requirements. As illustrated in FIG. 1, an example packet flow is provided where the ST is equal to the 3 consecutive packet errors. As shown in FIG. 1, in case A, since fewer than 3 consecutive packet errors are experienced, the service is in the up state. However, in case B, when the service experiences 3 consecutive packet errors, the service enters the down state, which may result in severe financial costs, as the production may stop. It is noted that, in this example, ST is based on consecutive packets. Nevertheless, other means for defining the ST can be utilized, e.g., in terms of absolute time.

A benefit of the ST awareness in 5GS is that 5GS is able to provide an overall packet error ratio (PER) that matches better with the actual application requirements and achieve much higher network efficiency for URLLC/TSC traffic flows. If ST is known, 5GS could use a lower target PER most of the time, and switch to higher target PER when the survival time is about to be exceeded.

As one example, assuming a service with overall PER=1 e-8 (QoS profile), then, if ST is known, 5GS could use target PER=1 e-3 for ~99.9% of the time and target PER ~1e-8 for ~0.1% of the time. However, if ST is not known, then 5GS would need to use target PER=1 e-8 for all packets.

Accordingly, ST awareness results in higher URLLC efficiency, which implies higher overall capacity (fewer resources reserved for URLLC), improved overall reliability and latency for URLLC traffic (at system level it reduces the probability of resource conflict with other URLLC traffic), and a larger number of URLLC devices can be supported.

Requirements for a periodic deterministic communication are shown in Table 1 below, which corresponds to the table from Section 8.1.2 of 3GPP TR 22.804. The packets arrive periodically where the period varies from 0.5 to 500 ms depending on the use case. The E2E latency, which needs to be guaranteed, should be less than the period of the packet arrival (transfer interval).

TABLE I

| Characteristic parameter (KPI) | | | | | Influence quantity | | | | | |
|---|---|---|---|---|---|---|---|---|---|---|
| Communication service availability | End-to-end latency: target value | End-to-end latency: jitter (note) | Message size [byte] | Transfer interval: target value | Survival time | UE speed | # of UEs | Service area | Requirement | Remark |
| >99.999% | <transfer interval | | 200 | 100 ms | ~500 ms | ≤42 m/s | See Remark | | Mass Transit 1.3, 1.4, 1.5, 1.6, 1.7, 1.8 | Control of automated train; 2 UEs per train unit |
| 99.9999% to 99.999999% | <transfer interval | | 20 to 50 | 0.5 ms to 2 ms | Transfer interval | ≤20 m/s | ≤100 | | Factories of the Future 2.1, 2.2, 2.3, 2.8, 2.10 | Motion control and control-to-control use cases |
| 99.9999% to 99.999999% | <transfer interval | | ≤1 k | ≥4 ms | Transfer interval | ≤20 m/s | ≤10 | | Factories of the Future 5.1, 5.3, 5.6 | Motion control and control-to-control use cases |
| >99.9999% | <transfer interval | <50% of | 40 to 150 k | 1 to 500 ms | Transfer interval | ≤14 m/s | ≤100 | ≤1 km2 | Factories of the future 6.1, | Mobile control |

TABLE I-continued

| Characteristic parameter (KPI) | | | | Influence quantity | | | | | | |
|---|---|---|---|---|---|---|---|---|---|---|
| Communication service availability | End-to-end latency: target value | End-to-end latency: jitter (note) | Message size [byte] | Transfer interval: target value | Survival time | UE speed | # of UEs | Service area | Requirement | Remark |
| | | transfer interval | | | | | | | 6.2, 6.4, 6.6, 7.1, 7.6; Electric Power Distribution 5.1, 5.2, 5.4 | panels, mobile robots, and differential protection |

It is noted that the jitter interval is symmetric. However, just the late arrivals count as a communication error. It is further noted that, in Table 1, the time parameters and the message size in row two and three are to be read as follows. First, a transfer interval value that lies within the provided interval is chosen. Then, the end-to-end latency and the survival time are inferred. For instance, if one chooses 10 ms in row four, then in this case the survival time is also 10 ms, and the end-to-end latency is smaller than 10 ms and the jitter is 5 ms. Next, the message size may be chosen, for instance, as 250 kbyte.

Studies made, according to the present disclosure, show that the handover interruption time may vary from 6 ms to 71 ms for a UE with a single transceiver depending on the features enabled, as shown in Table 2 below.

Based on this report, the source node can prepare one or more target cells for the handover (CHO Request+CHO Request Acknowledge) and then send, at 9, an RRC Reconfiguration (handover command) to the UE.

For the baseline handover of NR Release-15, the UE would immediately access the target cell to complete the handover. However, for CHO, the UE will access the target cell once an additional CHO execution condition is met (i.e., the handover preparation and execution phases are decoupled). The condition is configured, for example, by the source node in a handover command. For intra-frequency handover, A3 event can be configured as CHO execution condition where the UE triggers the CHO execution when the measurement of a target cell is better than the measurement of the serving cell by some offset for some Time-to-

TABLE 2

| Component | Description | Baseline HO | Make-before-Break | RACH-less | MBB & RACH-less |
|---|---|---|---|---|---|
| 1 | RRC Reconfiguration procedure delay | 10 ms[4] | 0 | 10 ms[4] | 0 |
| 2 | Target cell search $T_{search}$ | 0 (if target cell is known) | 0 (if target cell is known) | 0 (if target cell is known) | 0 (if target cell is known) |
| 3 | UE processing time $T_{processing}$ | 20 ms (upper limit for FR2) | $T_{processing}$ + $T_{IU}$ is reduced to 5 ms | 20 ms (upper limit for FR2) | $T_{processing}$ + $T_{IU}$ is reduced to 5 ms |
| 4 | Fine time tracking and acquiring full timing information of the target cell $T_\Delta$ | 20, 10 ms on average (default value for SMTC period) | 0/10 ms (FFS) | 20, 10 ms on average (default value for SMTC period) | 0/10 ms (FFS) |
| 5 | $T_{margin}$ | 2 ms | 0/2 (FFS) | 2 ms | 0/2 ms (FFS |
| 6 | Delay to acquire the first available PRACH in target gNB $T_{IU}$ | Up to 20, 10 on average (for smallest value of x = 1 defined in tables 6.3.3.2-2 and 6.3.3.2-3 of [6] for FR1 and table 6.3.3.2-4 for FR2) | 0 | Delay to acquire the UL grant to send RRC Reconfiguration Complete: 10 ms for FR1/1 ms for FR2 (FFS) | 0 |
| 7 | PRACH preamble transmission | 1 slot[7] (FR1/FR2: 1/0.125 ms) | 1 slot[7] (FR1/FR2: 1/0.125 ms | 0 | 0 |
| 8 | UL Allocation + TA for UE | 10 slots[7] (FR1/FR2: 10/1.25 ms) | 10 slots[7] (FR1/FR2: 10/1.25 ms) | 0 | 0 |
| 9 | UE sends RRC Reconfiguration Complete | 8 slots[7] (FR1/FR2: 8/1 ms) | 8 slots[7] (FR1/FR2: 8/1 ms) | 8 slots[7] (FR1/FR2: 8/1 ms) | 8 slots[7] (FR1/FR2: 8/1 ms) |
| | Ball-park total delay [ms] (FR1/FR2) | 71/54.4 ms | 24-36/7.4-19.375 ms | 60/44 ms | 13-25/6-18 ms |

Figure 2:
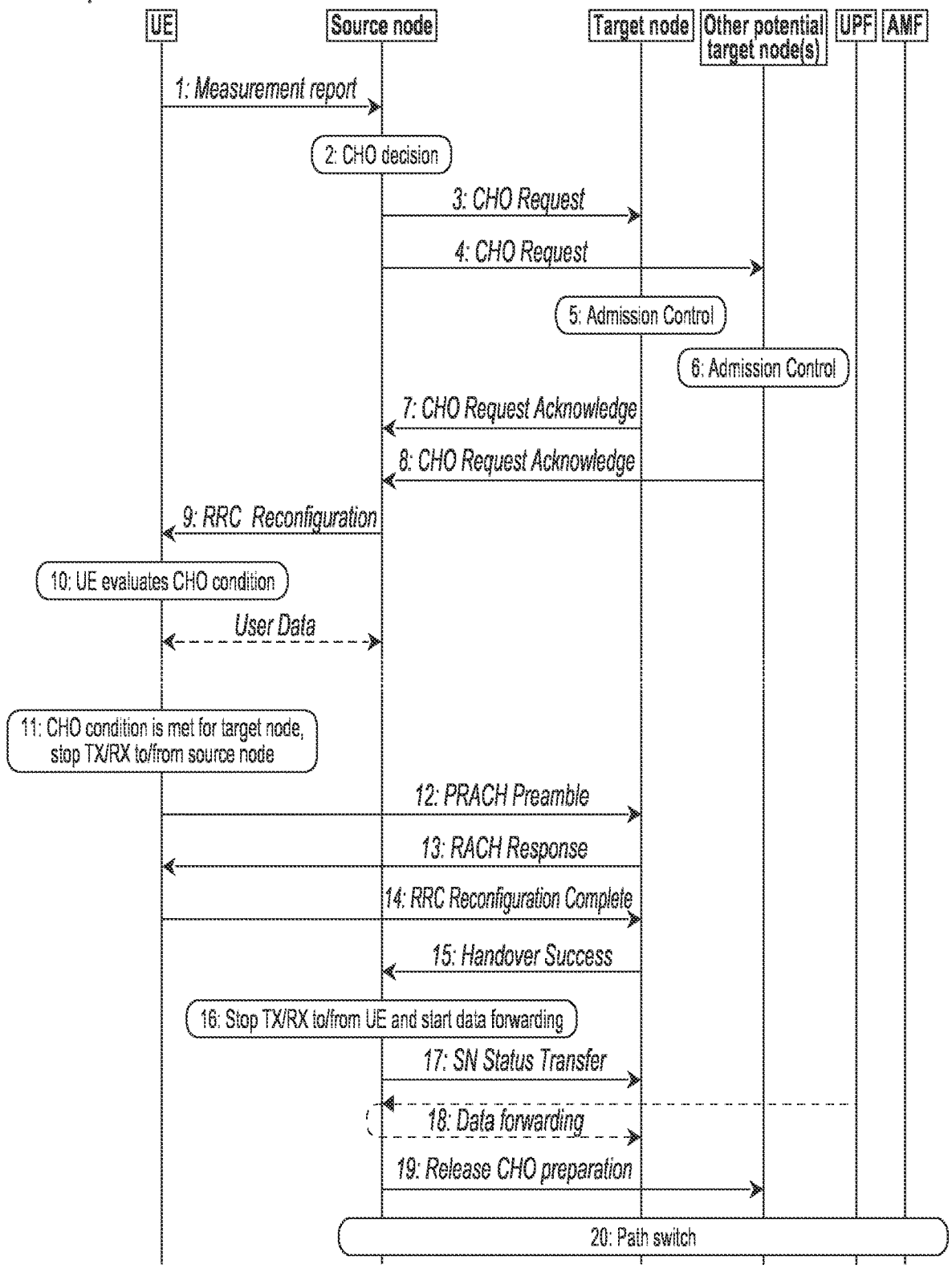
FIG. 2 illustrates an example message sequence diagram for conditional handover (CHO)

Conditional handover (CHO) was introduced in 3GPP Release-16 to improve mobility robustness by minimizing radio link failures (RLF) and handover failures. CHO is very similar to baseline handover procedure of NR Release-15. FIG. 2 illustrates an example message sequence diagram 200 for CHO. Procedures 1 to 9 of FIG. 2 are similar to the baseline handover of NR Release-15 (see 3GPP TS 38.300). As illustrated in the example of FIG. 2, a configured event may trigger the UE to send, at 1, a measurement report.

Trigger (TTT). For inter-frequency handover, event A5 is configured where the UE triggers CHO execution when the measurement of serving cell is below threshold 1 and the measurement of target cell is higher than threshold 2 for TTT.

The interruption time for CHO is similar to that of the baseline handover, which is approximately 71 ms for frequency range 1 (FR1) and 55 ms for frequency range 2 (FR2). This interruption time might be too high for many IIoT applications where the transfer interval time (periodicity of the packets)/survival time (time duration the UE could survive without receiving the required packets) might be shorter than the interruption during successful handover. Some enhancements to reduce the interruption time for CHO were considered in Release-16 such as, for example, to enable Make-before-Break (MBB) (similar to MBB specified for LTE Release-14) type of HO when performing a CHO. However, these enhancements for CHO were not pursued. Using MBB configuration in CHO, the UE would not detach from the source cell when the CHO execution condition is met, but rather continue to exchange data with the source cell until the UE is ready to send the physical random access channel (RACH) preamble. This solution for NR is expected to have the same gains as in MBB for LTE and reduce the interruption down to 24 ms in FR1 and 7.4 ms in FR2. If MBB is combined with RACH-less HO in NR, the interruption time can be reduced to 13 ms for FR1 and 6 ms for FR2. Both MBB and RACH-less solutions are not specified in NR, but they are potential candidate topics for NR Release-18. As such, there is some chance that future NR systems support handover procedures with interruption time that is shorter than the transfer interval/survival time of most or all of the IIoT use cases.

Dual Active Protocol Stack (DAPS) HO is another mobility procedure that was introduced to minimize the interruption time during a HO. In a DAPS HO, the UE can simultaneously connect to both the source and the target cell and therefore can perform data transmission to both cells that helps to minimize the interruption time. However, this requires that the UE is equipped with two radio transceivers, which might be a challenging requirement for some UE types.

Figure 3:
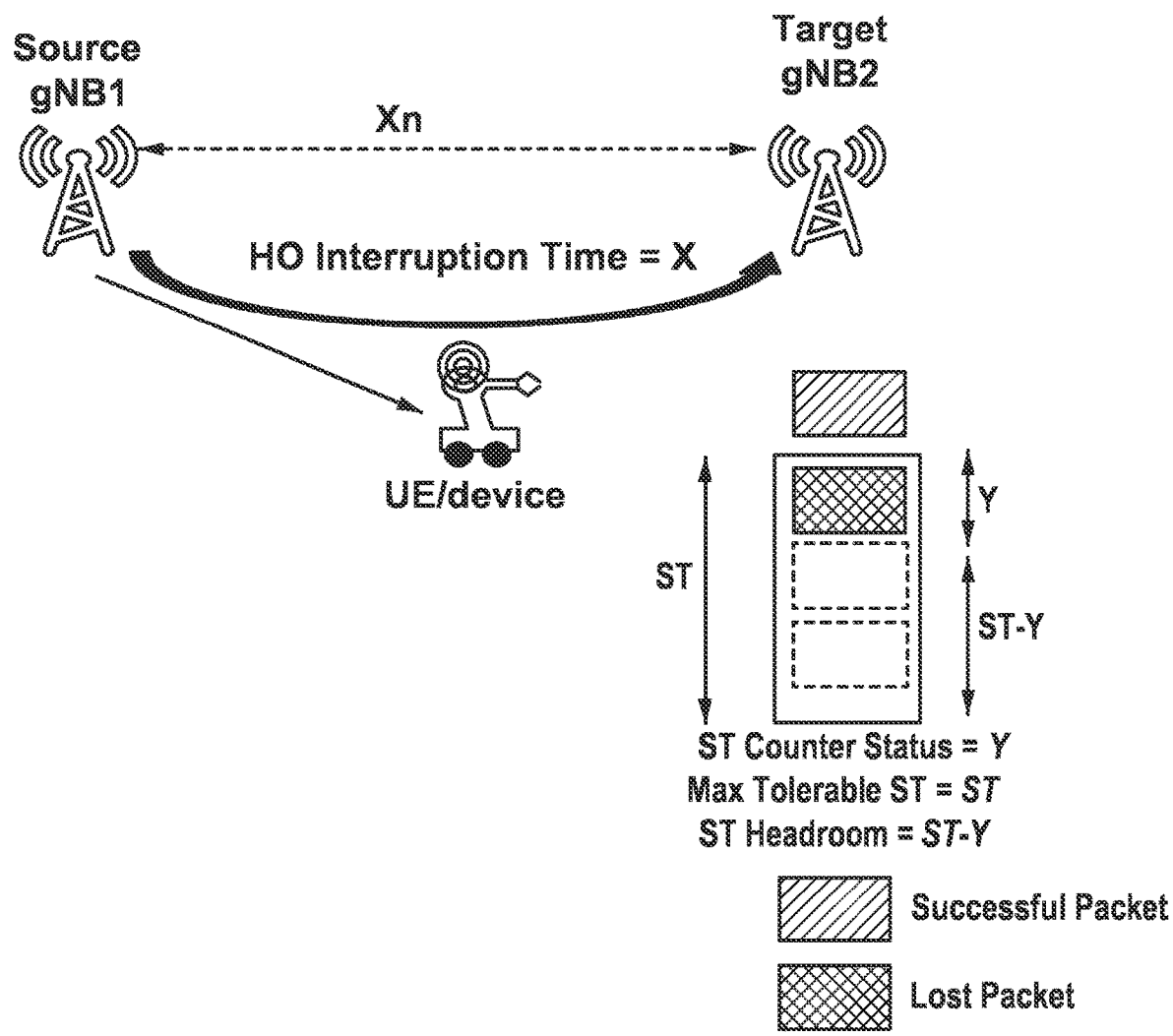
FIG. 3 illustrates an example diagram of survival time (ST) headroom including mobility interruption time during handover (HO), according to one example embodiment.

As discussed in detail herein, a problem addressed by example embodiments relates to the mobility scenario where the UE and the network support conditional handover mechanisms, which have interruption starting from the CHO execution condition fulfilment at the UE until the RRC configuration complete is received at the target cell and the data has been forwarded from source cell to target cell. FIG. 3 illustrates an example diagram of ST headroom including mobility interruption time during HO, according to one example embodiment. Although, the example embodiments are explained using conditional HO procedures, however the application of the presented methods is not limited to conditional HO only and may also be applicable to other mobility procedures.

In case of conditional handover there could be impact to traffic with ST requirements. For instance, for conditional handover scenarios, the UE may stop both transmission and reception with the source cell once the conditional HO execution is fulfilled at the UE. Unless the CHO is configured in a Make-Before-Break (MBB) manner in which case the UE does not immediately detach from source cell. However, this type of CHO configuration is also not yet specified and the UE can only delay the detach until it completes the decoding and the processing of target cell configuration. The communication may be resumed after the UE completes the RACH access with the target cell and the target cell sends a HO success message to the source cell that leads to data forwarding to the target cell. This data communication outage between the CHO execution condition fulfilment and the resumption after HO success is referred to as HO interruption time as denoted by "X" in the example of FIG. 3. In case the ST expires during this window, i.e., ST-Y<X, the handover is not beneficial for ST traffic as there is not enough survival time headroom to accommodate the delay in packet transfer during mobility interruption.

Therefore, certain example embodiments may address at least the problem of how to make the CHO mobility procedure aware of the UE's survival time for more robust handovers and to avoid that the UE's survival time expires during the CHO execution, which could lead to service breakdown of critical services.

As will be discussed below, certain example embodiments provide methods to modify the HO execution based on the survival time requirements of the involved UE in order to avoid potential ST expiry during the HO procedure.

In certain example embodiments, a gNB may be configured to provide a flexible HO execution condition, for example, in the form of at least one delta value (or at least one range of values) to actual HO execution conditions to allow some room for early or late execution of the HO. For instance, the delta values or range of delta values may indicate an acceptable amount of deviation from the actual HO execution conditions. According to this embodiment, the gNB may indicate the downlink stream (data bearer IDs), along with the transfer interval and the ST for which the CHO conditions need to be taken into account. In this embodiment, the UE may monitor the survival time buffer and expected time of next packet transmission to either advance or delay the HO execution within the range provided by the gNB. For example, depending on the instantaneous ST headroom, the UE can fallback to another, more relaxed CHO execution condition, which can ensure that the access towards the target cell will occur earlier, which, in turn, increases the chances of not expiring the ST.

According to an embodiment, during HO preparation, the target cell may indicate the range of ST headroom it can support (for example, max ST of 10 packets transfer interval with 5-10 packets transfer interval headroom). It is noted that lower ST headroom means that support for highly reliable transmission is needed. Hence, a target cell may indicate the ST headroom it can support. As an example, the supported ST headroom may be a single fixed value or a function of one or more parameters, such as signal strength, load, services or network slices which the UE uses, etc. In case the UE is associated to multiple services or slices with different survival time requirements the target network node would consider all those different requirements and provide the response accordingly. In this embodiment, during HO execution, the UE may take into account ST headroom support from target cell(s) especially if multiple target cells satisfy the execution condition (i.e., the ultimate selection of the target cell towards which the CHO is executed can be subject to cell-specific ST headroom supported by that cell and the current ST headroom of the UE).

In an embodiment, a gNB may be configured to provide parameters, such as thresholds for ST headroom, to modify the UL switching behavior of the UE during a HO, i.e., to delay the transmission of new packet data convergence protocol (PDCP) service data unit (SDU) to target cell (delay the uplink switching) if ST-Y'<X' where Y' is current ST status in UL and X' is the interruption caused by uplink (UL) switching. This is relevant, for instance, for DAPS or CHO & DAPS handover where the UL interruption time X' can be in the order of 10-20 ms in contrast to downlink which can be up to 2 ms.

As introduced above, according to an embodiment, a source gNB may provide delta values (or range of values) to actual HO execution conditions in order to allow some room for early or late execution. In certain embodiments, execution of the condition range can be defined by providing a range of handover margin/offset (HOM) and Time-to-Trigger (TTT) in addition to fixed values defining the optimal handover point (in terms of radio conditions), or by providing a timer "T" for the maximum allowed delay after CHO execution condition is met. For example, the UE may start the timer T when the CHO execution condition is met and the ST counter (number of transfer interval periods since the last successful reception of a packet) is greater than threshold 1. The threshold 1 indicates that, currently, some packets are lost and it is recommendable to wait for a next packet to be received successfully. After successful reception, the ST counter may be reset and the UE can execute the CHO immediately. If the ST Counter reaches threshold 2 during the timer T and there is still no successful reception of the packet, the UE may execute the CHO, without waiting for the expiry of timer T. Such a situation would indicate that the source cell is not getting better and the UE would need to immediately perform CHO execution. In some embodiments, threshold 1 and/or threshold 2 can be provided by the network.

From a radio signal stability perspective, the UE may also be provided with two additional parameters in the RRC-Reconfiguration message to support the flexible execution. These additional parameters may include a minimum target cell threshold for early execution and a minimum source cell threshold for late execution. The UE may monitor the survival time buffer and expected time of next packet transmission to either advance or delay the HO execution within the delta provided by the gNB.

Figure 4:
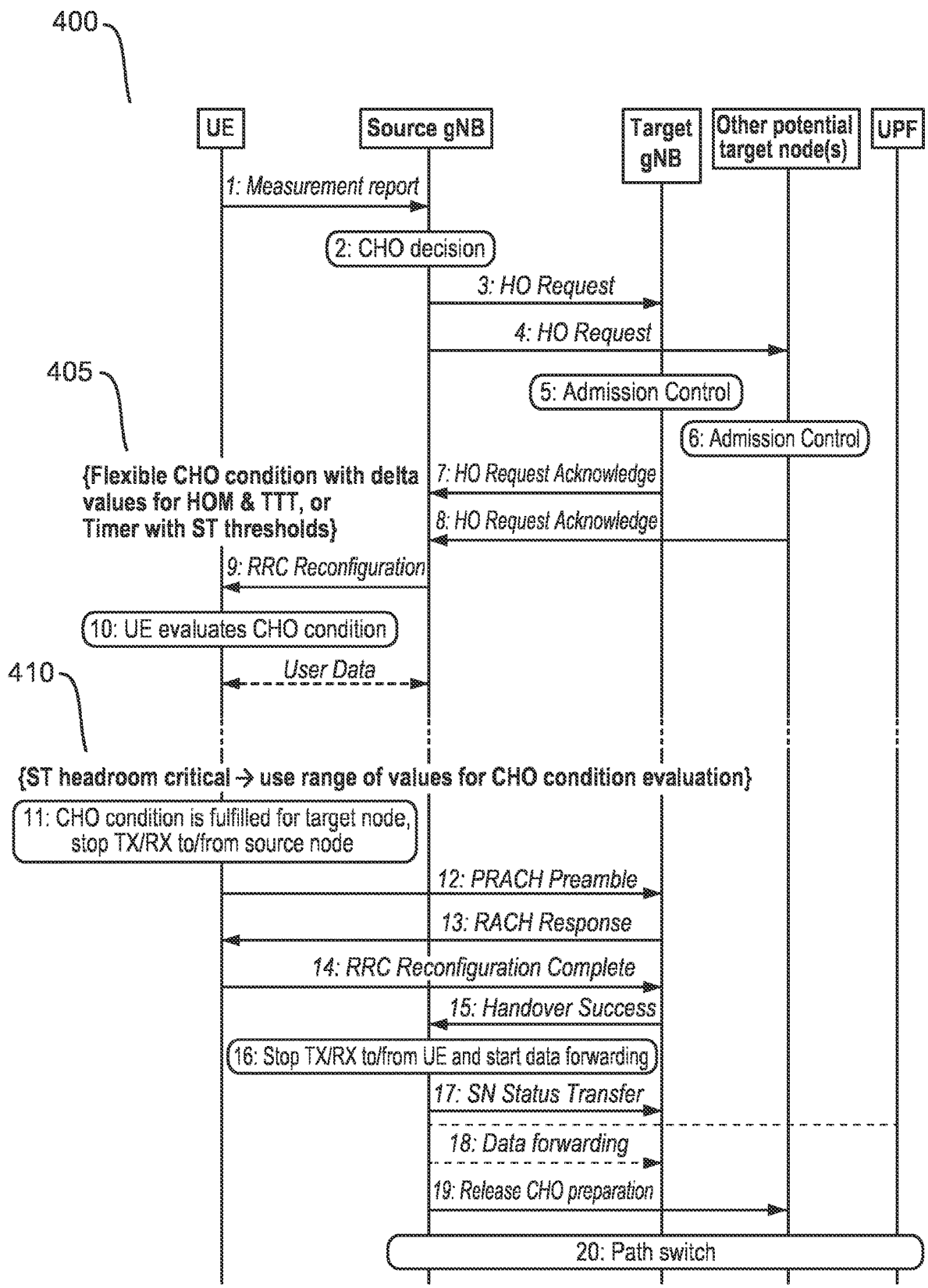
FIG. 4 illustrates an example message sequence diagram for CHO based on flexible execution condition, according to one embodiment.

FIG. 4 illustrates an example message sequence diagram 400 for CHO based on flexible execution condition, according to an embodiment. The example of FIG. 4 illustrates some "new" UE behavior for the flexible HO execution, as discussed in the following.

In an embodiment, before CHO execution condition fulfillment, if the remaining ST headroom considering the interruption time of HO reaches specific threshold provided by network/gNB at 405, the UE may trigger early execution. Here, the UE may check for minimum threshold (radio signal strength/quality) to be met by any CHO candidate for early execution.

Upon CHO execution condition fulfillment, the UE may check, at 410, the available ST headroom if it executes the CHO immediately. The UE may use the knowledge of the interval between its Configured Grant (CG) occasions, as well as an estimate of interruption duration if it executes the handover immediately, to predict the change in ST headroom. If the predicted ST headroom may lead to service shut-down, then the UE may continue with source transmission at least until a next ST packet. If this ST traffic is successful, the ST headroom counter may be reset and the UE can execute the handover immediately as the timer is restarted. In one example, the source node control parameter for flexible execution can be source primary cell (PCell) measurement threshold for delayed execution.

An example configuration may be as follows:
CHO condition 1: Regular/Optimal handover execution: Mn>Ms+3 dB
CHO condition 2: Early handover execution: Mn>Ms+2 dB
CHO condition 3: Late handover execution: Mn>Ms+4 dB; or
CHO condition 4: Handover execution: Mn>Ms+offset, where separate "offset" values may be provided for early, delayed and normal HO execution, and where Mn is measurement of the neighboring cell and Ms is the measurement of the source cell. It is noted that the above configuration is just one example for purposes of illustration and other embodiments are not limited to just this example configuration.

The UE may monitor its survival time headroom status and, if ST-Y<X when the regular CHO condition 1 is met, the UE can delay the CHO execution by checking CHO condition 3. If ST-Y>X and CHO condition 1 is not yet met, the UE can be allowed to execute an early handover when CHO condition 2 is met.

Figure 5A:
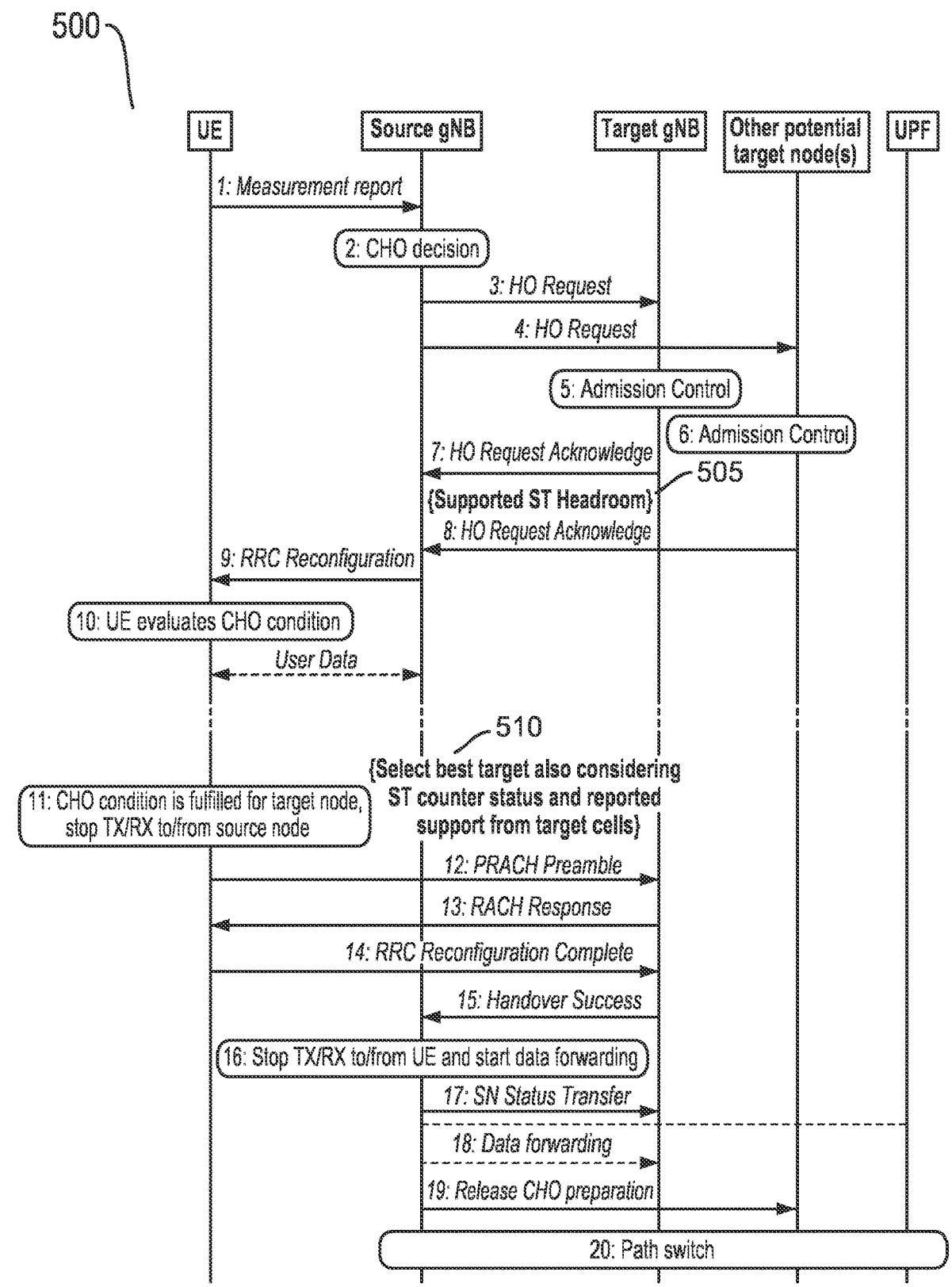
FIG. 5A illustrates an example message sequence diagram for a modified CHO based on ST headroom, according to another embodiment.

FIG. 5A illustrates an example message sequence diagram 500 for a modified CHO based on ST headroom, according to an embodiment. As illustrated in the example of FIG. 5A, a target gNB (i.e., target cell) HO request acknowledgement (ACK) may indicate, at 505, the range of ST headroom it can support (for example, max ST of 10 packets transfer interval time with 5-10 packets transfer interval time as headroom) for the requested QoS. If the CHO execution condition is met for multiple candidate target cells, at 510, the UE may also take into account ST support from target cells to decide best target cell. In one example, a measurement event can be defined where the UE triggers a measurement if the ST headroom crosses a threshold that is configured by the prepared cell. If this threshold is exceeded, then the source cell may send CHO cancel to cancel the preparation at the target cell or the source cell may send the measurement to the target cell which in turn may initiate CHO cancel to the source cell. The source cell may then de-configure the UE. The measurement configuration of this event may be configured by the source cell based on the information (range of ST headroom) that is shared by the target cell of handover.

An example configuration may be as follows:
Target 1: max ST of 10 packets transfer interval time with 5-10 packets transfer interval time as headroom) for the requested QoS;
Target 2: max ST of 10 packets transfer interval time with 7-10 packets transfer interval time as headroom) for the requested QoS.

If the UE's CHO execution condition is met for both the target cells, the UE may select the best target cell based on the ST headroom of the UE. As one example, if the UE's ST Headroom is currently 6, it would choose Target 1 for final CHO execution as Target 2 can just support UEs with ST headroom between 7 and 10. It is noted that the above configuration is just one example for purposes of illustration and other embodiments are not limited to just this example configuration.

Figure 5B:
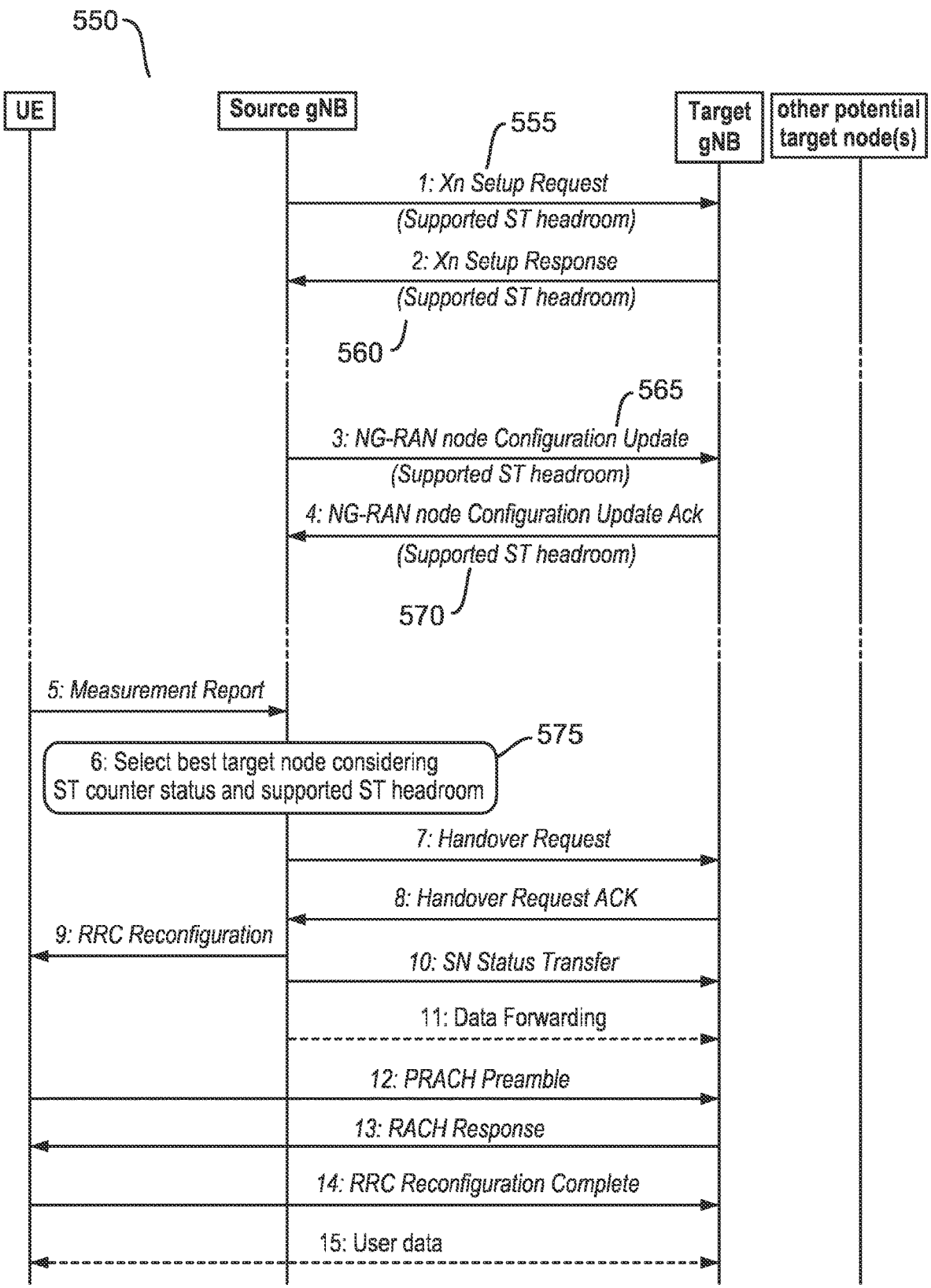
FIG. 5B illustrates an example message sequence diagram for a modified baseline handover based on ST headroom, according to an embodiment.

An embodiment may be directed to a network controlled PCell change (handover) or primary SCell (PSCell) change in a (MR)-DC deployment. For example, FIG. 5B illustrates an example message sequence diagram 550 for a modified baseline handover based on ST headroom, according to an embodiment. In one embodiment, as illustrated in the example of FIG. 5B, the target node may provide, at 560 the supported ST headroom to the source node during Xn setup procedure in, e.g., a Xn setup response message. In this procedure, according to an example embodiment, the source node can also provide, at 555, the supported ST headroom to the target node, e.g., in Xn setup request message.

In a further embodiment, the target node may provide, at 570 the supported ST headroom to the source node during NG-RAN node configuration update in, e.g., a NG-RAN node configuration update acknowledge message. In this procedure, according to an example embodiment, the source node can also provide, at 565, the supported ST headroom to the target node, e.g., in a NG-RAN node configuration update message.

In a further embodiment, the target node may provide the supported ST headroom to the source node during a resource status reporting procedure in, e.g., a resource status update message. In this example embodiment, the source node can request for the supported ST headroom, e.g., in a resource status request message.

According to various example embodiments, the target node may be a master node (MN) controlling a master cell group (MCG) comprised of PCell(s) and/or SCell(s) or may be a secondary node (SN) controlling a secondary cell group (SCG) comprised of PSCell(s) and/or SCell(s).

According to certain example embodiments, the supported ST headroom can be a list or a set of values. In addition, in some embodiments, the supported ST headroom can be a range of values. Moreover, the supported ST headroom can be the supported ST values, list, and/or range. Accordingly, in certain embodiments, instead of informing the other network node(s) about supported ST headroom for a given ST requirement, a network node can inform the other network node(s) about the ST values/list/range that it can support in general. Further, according to some example embodiments, the mobility procedure can comprise different types of handover methods such as, e.g., baseline HO, CHO, and DAPS HO.

As further illustrated in the example of FIG. 5B, at 575, using the information on the supported ST headroom, the source cell node can decide on the target node of PCell or PSCell change based on the received measurement report that might indicate more than one candidate for cell change.

Certain embodiments may be applicable to a CU-DU architecture. In one embodiment, a DU may provide a CU with the supported ST headroom during UE context setup in, e.g., a UE context setup response message. In a further embodiment, the DU may provide the CU with the supported ST headroom during UE context modification in, e.g., a UE context modification required message.

According to the some example embodiments, the supported ST headroom can be a list or a set of values. In addition, according to an embodiment, the supported ST headroom can be a range of values. Moreover, the supported ST headroom can be the supported ST values, list, and/or range. Accordingly, instead of informing the other network node(s) about supported ST headroom for a given ST requirement, a DU can inform the other network node(s) about the ST values/list/range that it can support in general. According to some embodiments, the mobility procedure can comprise different types of handover methods such as, e.g., baseline HO, CHO, and DAPS HO.

Further example embodiments may be applicable to cases where there is no Xn interface. In one embodiment, in case there is no Xn interface between the source node and target node(s), NG based HO can be utilized. In such a case, various information elements (IEs) related to the HO may be relayed via a core network entity, e.g., access and mobility function (AMF), toward a target node. ST related information, e.g., supported ST headroom, can be provided in, e.g., HO request acknowledgement message and/or HO command message communicated via the 5GC entity.

In another embodiment, in case there is no Xn interface between the source node and target node(s), ST related information can be communicated among the source and target node(s) via configuration transfer messages via a 5GC entity, e.g., AMF. An example procedure can include uplink RAN configuration transfer message and downlink RAN configuration transfer, where, e.g., a SON configuration transfer IE could be used to include the ST related information, such as the supported ST headroom.

As mentioned above, according to some embodiments, the supported ST headroom can be a list, a set of values, and/or a range of values. Alternatively, instead of informing the other network node(s) about supported ST headroom for a given ST requirement, a network node can inform the other network node(s) about the ST values, list, and/or range that it can support in general.

The survival time (ST) is defined in 3GPP TS 22.104 [1] as indicating the time period the communication service may not meet the application's requirement before there is a failure that results in the communication service being deemed to be in an unavailable state, and/or the time that an application consuming a communication service may continue without an anticipated message. The survival time ST is greater than or equal to the packet arrival period called transfer interval and is typically a multiple of the transfer interval. A survival time ST of zero indicates that no packet shall be missing.

As an example, assume that the survival time ST is equal to 2 times the transfer interval. This means out of any 3 consecutive packets at least one has to be successfully delivered. According to this example, if the transmission of the first two packets failed, then the third packet needs to be transmitted with very high reliability so that it is almost surely successfully received.

During the HO response, the target gNB may indicate to the source gNB the list of supported survival time (SST), i.e., the time duration within which the target gNB will be able to send the next packet successfully to the UE. The source gNB can utilize this information from different possible target gNBs and choose a most suitable target gNB. Accordingly, the supported survival time (SST) intervals may be shared from the target gNB to the source gNB as a part of HO response.

Figure 6:
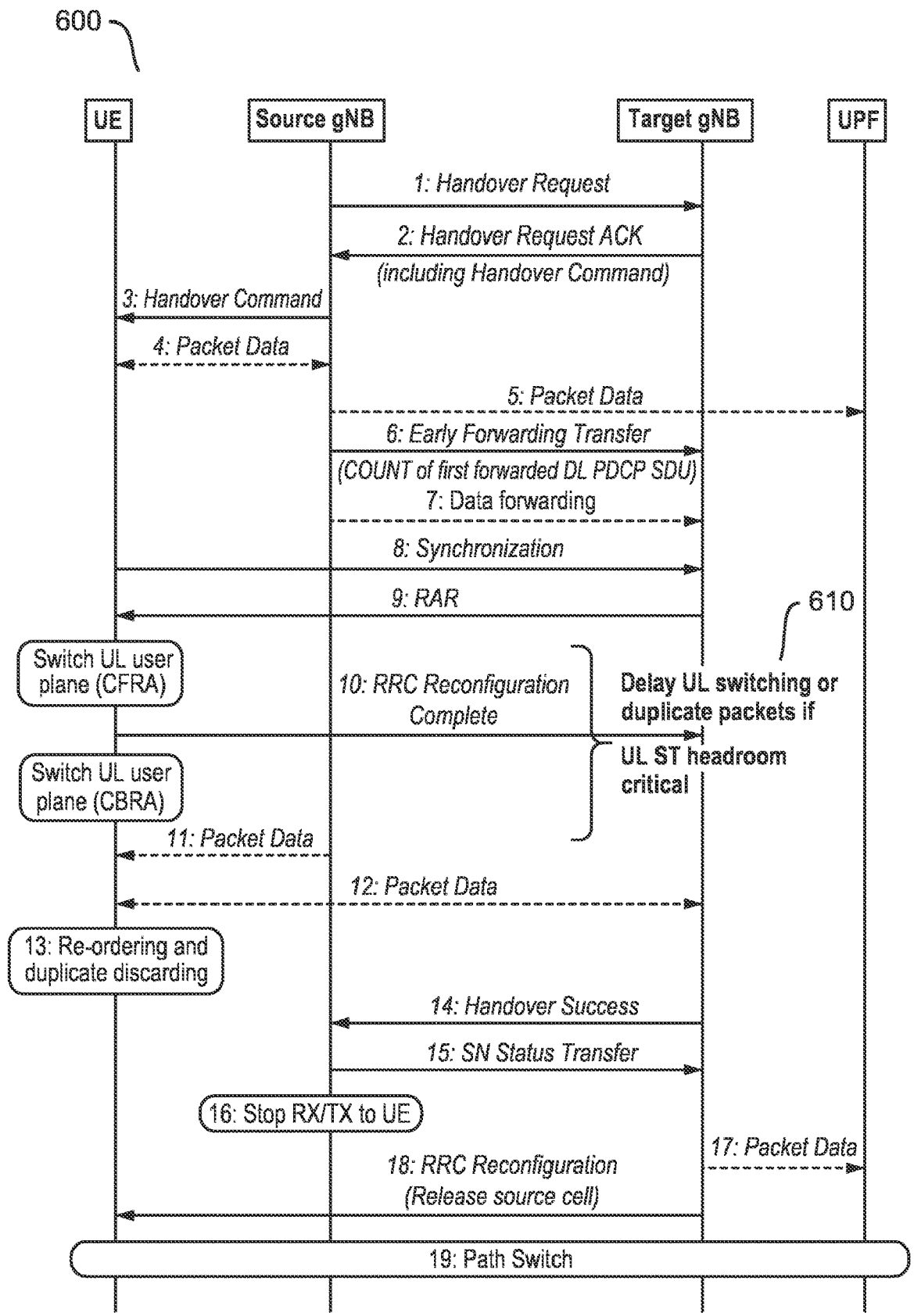
FIG. 6 illustrates an example message sequence diagram, according to another embodiment.

An embodiment may be directed to a DAPS type HO or a combination of CHO and DAPS handover if specified in the future. FIG. 6 illustrates an example message sequence diagram 600, according to this embodiment. Since, in a DAPS type of HO, the UE can be connected to both the source and target cells during the HO execution phase, changing the HO execution condition based on ST headroom may not be required. However, in DAPS HO the UE can experience some delays in the uplink direction (e.g., between step 8 and step 12 in the example of FIG. 6) when it performs the UL switching from the source to the target cell. For cases where this delay could be critical to meet the ST requirements, the UL switching steps can be modified as follows. The UE can decide to shift the UL switching time instant based on the ST headroom experienced during HO. The UE may also decide to duplicate the packets via source and target on handover complete instead of delayed uplink switching. The UE may be configured by the network with "thresholds" for the ST headroom counter to decide on whether the deferral should be performed. The UE may also decide, as illustrated at 610, about the delayed switching or packet duplication based on UE implementation, if no thresholds are configured by the network.

An example configuration may be as follows: Delay UL switching if ST-Y'<X', where ST is the total survival time, Y' is ST current status in UL and X' is the expected interruption caused by UL switching. In one example deployment, if the network observes/expects the UL switching interruption time to be, for example, 15 ms. Then, it can configure X'=15 so that if the UE at the moment of UL switching during a HO observes that its ST-Y'<15 then it would delay the switching otherwise it would continue with the UL switching. In another embodiment, the expected interruption time (X') could also be estimated by the UE directly. It is noted that the above configuration is just one example for purposes of illustration and other embodiments are not limited to just this example configuration.

It should be noted that the procedures depicted in the example embodiments of FIG. 4, FIG. 5, and FIG. 6, respectively, can be combined in any appropriate manner. In other words, in certain examples, the procedures shown in FIG. 4, FIG. 5, and FIG. 6 are not necessarily standalone procedures and can be combined.

Figure 7A:
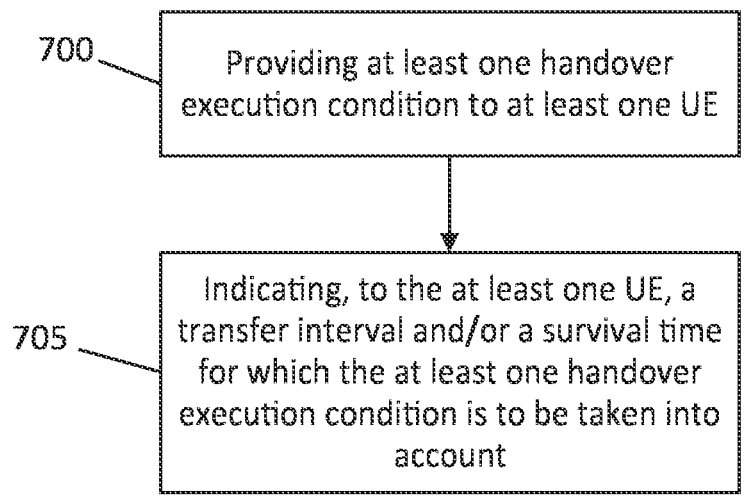
FIG. 7A illustrates an example flow chart of a method, according to an embodiment.

FIG. 7A illustrates an example flow diagram of a method for survival time dependent flexible handover execution, according to one embodiment. In certain example embodiments, the flow diagram of FIG. 7A may be performed by a network entity or network node in a communications system, such as LTE or 5G NR. In some example embodiments, the network entity performing the method of FIG. 7A may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 7A may include a source network node, source gNB, or source cell, such as those illustrated in the examples of FIGS. 2-6.

As illustrated in the example of FIG. 7A, the method may include, at 700, providing at least one handover execution condition to at least one user equipment. The at least one handover execution condition may include one or more delta values, or a range of delta values, with respect to one or more actual handover execution conditions to allow for early and/or late execution of a handover by the at least one user equipment. The method may also include, at 705, indicating, to the at least one user equipment, a transfer interval and/or a survival time information for which the at least one handover execution condition is to be taken into account. In an embodiment, the indicating 705 may also include indicating to the at least one user equipment, at least one of a range of handover margin/offset, a time-to-trigger, or a timer for a maximum allowed delay after the at least one handover execution condition is met. According to one embodiment, the method may also include providing, to the at least one user equipment, parameters indicating a minimum target cell threshold for early execution of the handover and a minimum source cell threshold for late execution of the handover.

Figure 7B:
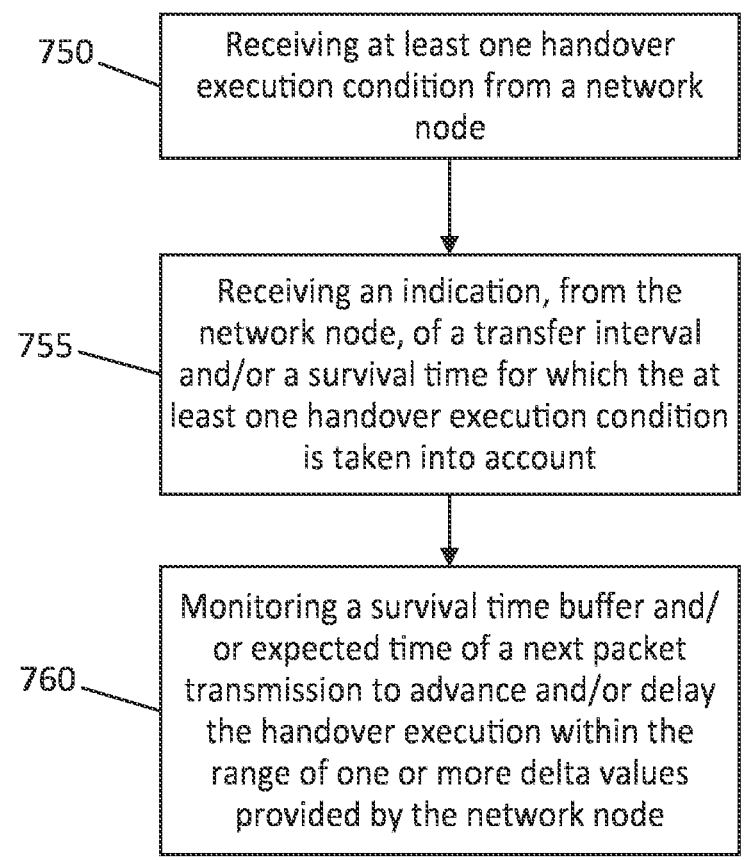
FIG. 7B illustrates an example flow chart of a method, according to an embodiment.

FIG. 7B illustrates an example flow chart of a method for survival time dependent flexible handover execution, according to one embodiment. In certain example embodiments, the example flow diagram of FIG. 7B may be performed by a network entity or network node in a communications system, such as LTE or 5G NR. In some example embodiments, the network entity performing one or more of the procedures depicted in FIG. 7B may include or be included in a UE, SL UE, relay UE, mobile station, mobile device, stationary device, a wireless transmit/receive unit, IoT device or sensor, or the like. For example, the entity performing the method of FIG. 7B may include a UE, as illustrated in the example diagrams of FIGS. 4-6.

As illustrated in the example of FIG. 7B, the method may include, at 750, receiving at least one handover execution condition from a network node (e.g., a source gNB). The at least one al handover execution condition may include one or more delta values, or a range of delta values, with respect to one or more actual handover execution conditions to allow for early and/or late execution of a handover by the at least one user equipment.

In an embodiment, the method may also include, at 755, receiving an indication, from the network node, of a transfer interval and/or a survival time for which the at least one handover execution condition is taken into account. In one example, the indication may include an indication of at least one of a range of handover margin/offset, a time-to-trigger, or a timer (T) for a maximum allowed delay after the at least one handover execution condition is met. According to an embodiment, the method may include starting the timer (T) when the at least one handover execution condition is met and when a survival time counter representing a number of transfer interval periods since the last successful reception of a packet is greater than a first threshold (threshold 1).

The first threshold may indicate that at least one packet is currently lost and it is recommendable to wait for a next packet to be received successfully.

In one embodiment, after successful reception of the next packet, the method may include resetting the survival time counter and executing the handover. According to an embodiment, when the survival time counter reaches a second threshold while the timer (T) is running and there is still no successful reception of the next packet, the method may include executing the handover without waiting for expiry of the timer (T). According to an embodiment, the method may include receiving, from the network node, parameters indicating a minimum target cell threshold for early execution of the handover and/or a minimum source cell threshold for late execution of the handover. In certain embodiments, the method of FIG. 7B may include, at 760, monitoring a survival time buffer and expected time of a next packet transmission to advance or delay the handover execution within the range of the one or more delta values provided by the network node.

Figure 8A:
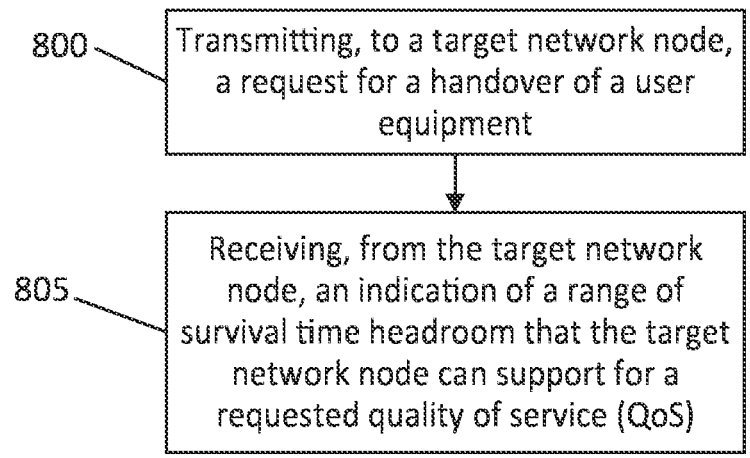
FIG. 8A illustrates an example flow chart of a method, according to an embodiment.

FIG. 8A illustrates an example flow diagram of a method for survival time dependent flexible handover execution, according to one embodiment. In certain example embodiments, the flow diagram of FIG. 8A may be performed by a network entity or network node in a communications system, such as LTE or 5G NR. In some example embodiments, the network entity performing the method of FIG. 8A may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 8A may include a source network node, source gNB, or source cell, such as those illustrated in the examples of FIGS. 2-6.

As illustrated in the example of FIG. 8A, the method may include, at 800, transmitting, to a target network node, a request for a conditional handover of a user equipment. The method may also include, at 805, receiving, from the target network node, an indication of a range of survival time headroom that the target network node can support for a requested quality of service (QoS). In some embodiments, the supported survival time headroom may include a single fixed value or a function of one or more parameters, such as signal strength, load, services or network slices which the UE uses, etc. In case the UE is associated to multiple services or slices with different survival time requirements the target network node would consider all those different requirements and provide the response accordingly.

According to certain embodiments, the method may include configuring a measurement event threshold for the user equipment based on the indicated range of survival time supported by the target network node. In an embodiment, when the supported survival time headroom exceeds the measurement event threshold, a measurement may be triggered at the user equipment and the method may include transmitting a message to the target network node to cancel preparation of the conditional handover, or transmitting the measurement to the target network node which in turn may decide to initiate cancelation of the conditional handover. In one example, the target network node may inform the source network node of the decision to cancel preparation of the handover.

Figure 8B:
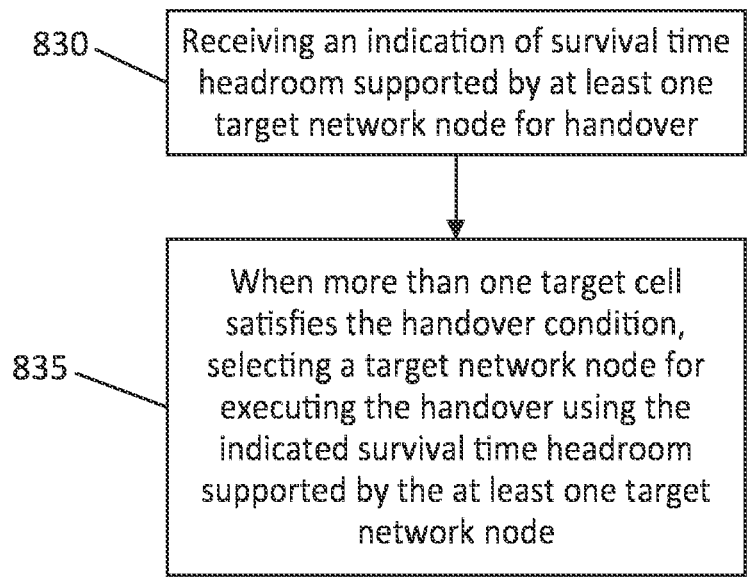
FIG. 8B illustrates an example flow chart of a method, according to an embodiment.

FIG. 8B illustrates an example flow chart of a method for survival time dependent flexible handover execution, according to one embodiment. In certain example embodiments, the example flow diagram of FIG. 8B may be performed by a network entity or network node in a communications system, such as LTE or 5G NR. In some example embodiments, the network entity performing one or more of the procedures depicted in FIG. 8B may include or be included in a UE, SL UE, relay UE, mobile station, mobile device, stationary device, a wireless transmit/receive unit, IoT device or sensor, or the like. For example, the entity performing the method of FIG. 8B may include a UE, as illustrated in the example diagrams of FIGS. 4-6.

As illustrated in the example of FIG. 8B, the method may include, at 830, receiving an indication of survival time headroom supported by at least one target network node for handover. In one embodiment, before the handover execution condition is met, when remaining survival time headroom considering an interruption time of the handover reaches a certain threshold, early execution of the handover may be triggered by the user equipment. The triggering of early execution of the handover may include checking for a minimum threshold of radio signal strength and/or quality to be met by a target network node that is a handover candidate for the early execution of the handover. The method may include, at 835, during execution of the handover, when more than one target cell satisfies the handover execution condition, selecting a target network node for executing the handover using the indicated survival time headroom supported by the at least one target network node. In an embodiment, the method may also include receiving a configuration for a measurement event threshold and, when the indicated survival time headroom exceeds the measurement event threshold, triggering a measurement by the user equipment.

Figure 8C:
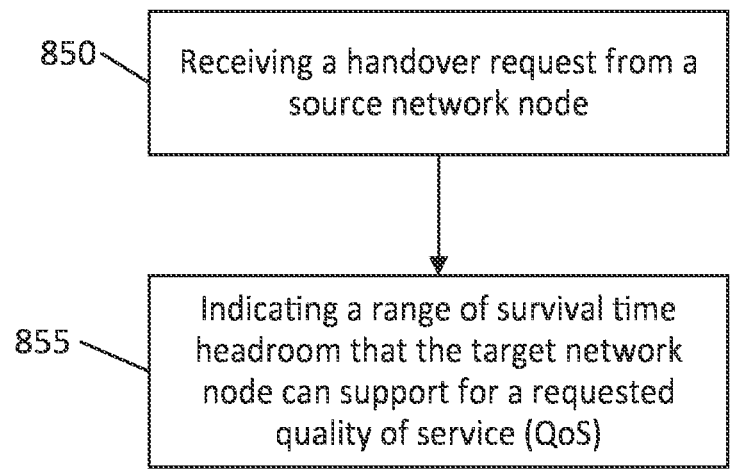
FIG. 8C illustrates an example flow chart of a method, according to an embodiment.

FIG. 8C illustrates an example flow diagram of a method for survival time dependent flexible handover execution, according to one embodiment. In certain example embodiments, the flow diagram of FIG. 8C may be performed by a network entity or network node in a communications system, such as LTE or 5G NR. In some example embodiments, the network entity performing the method of FIG. 8C may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 8C may include a target network node, target gNB, or target cell, such as those illustrated in the examples of FIGS. 2-6.

As illustrated in the example of FIG. 8C, the method may include, at 850, receiving a handover request from a source network node. The method may include, at 855, indicating a range of survival time headroom that the target network node can support for a requested quality of service (QoS). In certain embodiments, the supported survival time headroom comprises a single fixed value or a function of one or more parameters, such as signal strength, load, services or network slices which the UE uses, etc. In case the UE is associated to multiple services or slices with different survival time requirements the target network node would consider all those different requirements and provide the response accordingly.

Figure 8D:
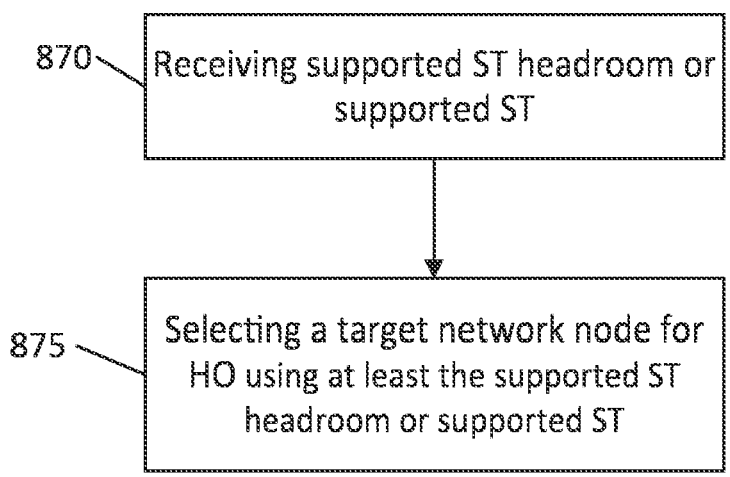
FIG. 8D illustrates an example flow chart of a method, according to an embodiment.

FIG. 8D illustrates an example flow diagram of a method for survival time dependent flexible handover execution, according to one embodiment. In certain example embodiments, the flow diagram of FIG. 8D may be performed by a network entity or network node in a communications system, such as LTE or 5G NR. In some example embodiments, the network entity performing the method of FIG. 8D may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 8D may include a source network node, source gNB, or source cell, such as those illustrated in the examples of FIGS. 2-6.

As illustrated in the example of FIG. 8D, the method may include, at 870, receiving or obtaining, at a first network node, the supported survival time headroom or supported survival time that a second network node can support. In an embodiment, the first network node may include at least one of a source network node, a master node controlling a master cell group (MCG), secondary node controlling a secondary cell group (SCG), or a central unit (CU). In an embodiment, the second network node may include at least one of a target network node, a master node controlling a master cell group (MCG), secondary node controlling a secondary cell group (SCG) or a distributed unit (DU). According to some embodiments, the survival time headroom or supported survival time may include at least one of a list of values, a set of values, or a range of values. According to certain embodiments, the receiving 870 may include receiving the supported survival time headroom during a Xn setup procedure, during a NG-RAN node configuration update, during a resource status reporting procedure, during NG based handover (in case there is no Xn interface between the first and second network node), during handover preparation over Xn, and/or during a UE context modification.

As illustrated in the example of FIG. 8D, the method may include, at 875, selecting a target network node for handover of a UE using at least the supported survival time headroom or supported survival time and a measurement report received from the UE. In some embodiments, the handover may include one or more of a baseline handover, conditional handover, or dual active protocol stack (DAPS) handover. In an embodiment, the selecting 875 may include determining the target node for a primary cell (PCell) or primary secondary cell (PSCell) change based on the measurement report that indicates more than one candidate target cell and the supported survival time headroom or supported survival time. According to some embodiments, when there is no Xn interface between the first network node and the second network node, the method may include relaying information elements related to the handover or configuration transfer messages via a core network entity, such as a 5GC entity or AMF.

Figure 9A:
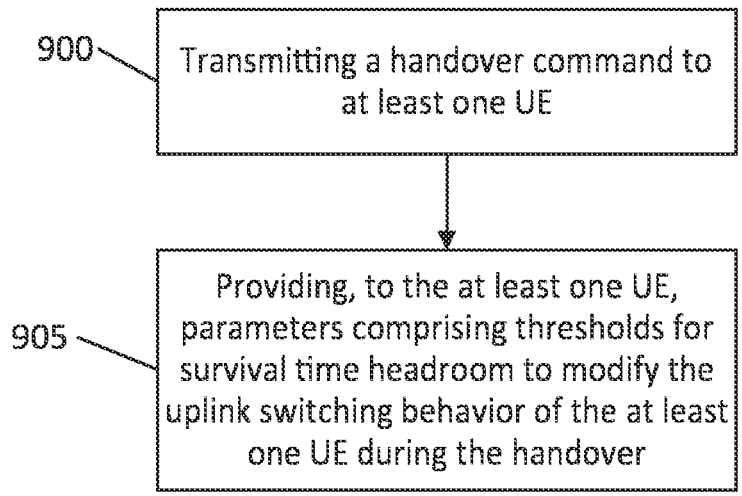
FIG. 9A illustrates an example flow chart of a method, according to an embodiment.

FIG. 9A illustrates an example flow diagram of a method for survival time dependent flexible handover execution, according to one embodiment. In certain example embodiments, the flow diagram of FIG. 9A may be performed by a network entity or network node in a communications system, such as LTE or 5G NR. In some example embodiments, the network entity performing the method of FIG. 9A may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 9A may include a source network node, source gNB, or source cell, such as those illustrated in the examples of FIGS. 2-6.

As illustrated in the example of FIG. 9A, the method may include, at 900, transmitting a handover command to at least one user equipment. The method may also include, at 905, providing, to the at least one user equipment, parameters comprising thresholds for survival time headroom to modify the uplink switching behavior of the at least one user equipment during the handover. For example, the uplink switching behavior may be modified to delay transmission of a new packet data convergence protocol (PDCP) service data unit (SDU) to a target network node.

Figure 9B:
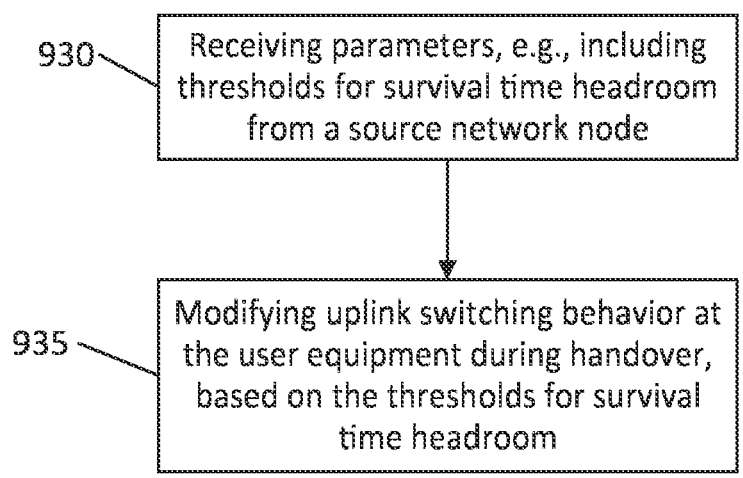
FIG. 9B illustrates an example flow chart of a method, according to an embodiment.

FIG. 9B illustrates an example flow chart of a method for survival time dependent flexible handover execution, according to one embodiment. In certain example embodiments, the example flow diagram of FIG. 9B may be performed by a network entity or network node in a communications system, such as LTE or 5G NR. In some example embodiments, the network entity performing one or more of the procedures depicted in FIG. 9B may include or be included in a UE, SL UE, relay UE, mobile station, mobile device, stationary device, a wireless transmit/receive unit, IoT device or sensor, or the like. For example, the entity performing the method of FIG. 9B may include a UE, as illustrated in the example diagrams of FIGS. 4-6.

As illustrated in the example of FIG. 9B, the method may include, at 930, receiving parameters, for example, including thresholds for survival time headroom from a source network node. The method may include, at 935, modifying uplink switching behavior at the user equipment during handover, based on the thresholds for survival time headroom. In an embodiment, the modifying 935 may include deciding to shift the uplink switching time instant based on the survival time headroom experienced during the handover. According to an embodiment, the modifying 935 may include deciding to duplicate the packets via the source and target network nodes on completion of the handover instead of delayed uplink switching. In one embodiment, the method may further include receiving a configuration of thresholds for the survival time headroom counter to decide on whether to delay uplink switching or packet duplication. In an embodiment, the modifying 935 may include deciding on whether to delay uplink switching or packet duplication based on the user equipment implementation.

It is noted that, in certain embodiments, the methods depicted in FIGS. 7A, 7B, 8A, 8B, 8C, 9A and 9B may be combined in any appropriate manner.

FIG. 10A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may represent a source node, source gNB or source cell, such as that illustrated in FIGS. 2-6.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10A.

As illustrated in the example of FIG. 10A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 10A, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In one example embodiment, apparatus 10 may be a source network node or source gNB. For example, in some embodiments, apparatus may be configured to perform one or more of the processes depicted in any of the flow charts or signaling diagrams described herein, such as that illustrated in FIG. 4-6, 7A, 8A or 9A. In some embodiments, as discussed herein, apparatus 10 may be configured to perform a procedure relating to survival time dependent flexible handover execution, for example.

FIG. 10B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 10B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10B.

As illustrated in the example of FIG. 10B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a UE, communication node, mobile equipment (ME), mobile station, mobile device, stationary device, IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as that illustrated in FIG. 4-6, 7B, 8B or 9B. Thus, according to an embodiment, apparatus 20 may be configured to perform a procedure relating to survival time dependent flexible handover execution as discussed elsewhere herein, for instance.

FIG. 10C illustrates an example of an apparatus 30 according to another example embodiment. In an example embodiment, apparatus 30 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in a target network node, target gNB or target cell, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus may include components or features not shown in FIG. 10C.

As illustrated in the example of FIG. 10C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 10C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a target network node, target gNB or target cell, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as that illustrated in FIG. 4-6, or 8C. According to certain example embodiments, apparatus 30 may be configured to perform a procedure relating to survival time dependent flexible handover execution as described elsewhere herein, for instance.

In some embodiments, an apparatus (e.g., apparatus 10 and/or apparatus 20 and/or apparatus 30) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, certain embodiments can help to achieve robust mobility for survival time critical services. The enhancements provided by example embodiments may ensure service continuity by avoiding survival time expiry during the HO procedure that would be critical for URLLC use cases involving UE mobility. In addition, certain embodiments can help to achieve future survival time requirements during the UE mobility, where the risk of ST expiry is especially high and can be mitigated. Furthermore, an embodiment specifies how ST can be used with CHO, which is a solution that ensure reliability and robustness. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:
1. A method, comprising:
receiving, by a user equipment, at least one handover execution condition from a network node, wherein the at least one handover execution condition comprises at least one delta value with respect to at least one actual handover execution condition to allow for early and late execution of a handover by the user equipment;
receiving, from the network node, an indication of a transfer interval and a survival time for which the at least one handover execution condition is taken into account, wherein the indication further comprises a second indication of a range of handover margin/offset, a time-to-trigger, and a timer for a maximum allowed delay after the at least one handover execution condition is met, the indication further comprising a third indication indicating that before the handover execution condition is met, when remaining survival time headroom considering an interruption time of the handover reaches a certain threshold, early execution of the handover is to be triggered by the user equipment, wherein the triggering comprises checking for a minimum threshold of radio signal strength and quality to be met by a target network node that is a handover candidate for the early execution of the handover;
determining that the at least one handover execution condition is met;
determining that a survival time counter representing a number of transfer interval periods since a last successful reception of a packet is greater than a first threshold;
starting the timer based on the at least one handover execution condition being met and the survival time counter representing the number of transfer interval periods since the last successful reception of the packet is greater than a first threshold, wherein the first threshold indicates that at least one packet is currently lost and it is recommendable to wait for a next packet to be received successfully;
based on determining that the survival time counter reaches a second threshold while the timer is running and there is still no successful reception of the next packet, initiate executing the handover without waiting for expiry of the timer;
during execution of the handover, when a plurality of target network nodes satisfies the handover condition, using the indicated survival time headroom supported by the target network node to select a best target network node for executing the handover by:
based on the survival time headroom exceeding a threshold that is configured by the target network node, canceling the handover with the target network node;

receiving, from the target network node, a range of survival time headroom the target network node can support;

select a new target network node from the plurality of target network nodes that supports a define number of maximum survival time packets transfer interval with a certain number range of packets transfer interval headroom for a request quality of service by the user equipment; and execute the handover with the new target network node.

2. The method of claim 1, wherein, after successful reception of the next packet, resetting the survival time counter and executing the handover.

3. The method of claim 2, further comprising:
receiving, from the network node, parameters indicating a minimum target cell threshold for early execution of the handover and a minimum source cell threshold for late execution of the handover.

4. The method of claim 3, further comprising:
monitoring a survival time buffer and expected time of a next packet transmission to advance and delay the handover execution within a range of the at least one delta value provided by the network node.

5. The method of claim 4, further comprising:
receiving, at the user equipment, an indication of survival time headroom supported by at least one target network node for handover.

6. The method of claim 5, further comprising:
receiving a configuration for a measurement event threshold; and
when the indicated survival time headroom exceeds the measurement event threshold, triggering a measurement by the user equipment.

7. A user equipment comprising:
a processor; and
a memory comprising computer-executable instructions that, when executed by the processor, cause the user equipment to perform the following operations:
receiving at least one handover execution condition from a network node, wherein the at least one handover execution condition comprises at least one delta value with respect to at least one actual handover execution condition to allow for early and late execution of a handover by the user equipment;
receiving, from the network node, an indication of a transfer interval and a survival time for which the at least one handover execution condition is taken into account, wherein the indication further comprises a second indication of a range of handover margin/offset, a time-to-trigger, and a timer for a maximum allowed delay after the at least one handover execution condition is met, the indication further comprising a third indication indicating that before the handover execution condition is met, when remaining survival time headroom considering an interruption time of the handover reaches a certain threshold, early execution of the handover is to be triggered by the user equipment, wherein the triggering comprises checking for a minimum threshold of radio signal strength and quality to be met by a target network node that is a handover candidate for the early execution of the handover;
determining that the at least one handover execution condition is met;
determining that a survival time counter representing a number of transfer interval periods since a last successful reception of a packet is greater than a first threshold;
starting the timer based on the at least one handover execution condition being met and the survival time counter representing the number of transfer interval periods since the last successful reception of the packet is greater than a first threshold, wherein the first threshold indicates that at least one packet is currently lost and it is recommendable to wait for a next packet to be received successfully;
based on determining that the survival time counter reaches a second threshold while the timer is running and there is still no successful reception of the next packet, initiate executing the handover without waiting for expiry of the timer;
during execution of the handover, when a plurality of target network nodes satisfies the handover condition, using the indicated survival time headroom supported by the target network node to select a best target network node for executing the handover by:
based on the survival time headroom exceeding a threshold that is configured by the target network node, canceling the handover with the target network node;
receiving, from the target network node, a range of survival time headroom the target network node can support;
select a new target network node from the plurality of target network nodes that supports a define number of maximum survival time packets transfer interval with a certain number range of packets transfer interval headroom for a request quality of service by the user equipment; and
execute the handover with the new target network node.

8. The user equipment of claim 7, wherein, after successful reception of the next packet, resetting the survival time counter and executing the handover.

9. The user equipment of claim 8, wherein the computer-executable instructions, when executed by the processor, further cause the user equipment to perform the following operation:
receiving, from the network node, parameters indicating a minimum target cell threshold for early execution of the handover and a minimum source cell threshold for late execution of the handover.

10. The user equipment of claim 9, wherein the computer-executable instructions, when executed by the processor, further cause the user equipment to perform the following operation:
monitoring a survival time buffer and expected time of a next packet transmission to advance and delay the handover execution within a range of the at least one delta value provided by the network node.

11. The user equipment of claim 10, wherein the computer-executable instructions, when executed by the processor, further cause the user equipment to perform the following operation:
receiving, at the user equipment, an indication of survival time headroom supported by at least one target network node for handover.

12. The user equipment of claim 11, wherein the computer-executable instructions, when executed by the processor, further cause the user equipment to perform the following operations:

receiving a configuration for a measurement event threshold; and when the indicated survival time headroom exceeds the measurement event threshold, triggering a measurement by the user equipment.

13. A system comprising:
a user equipment;
a processor; and
a memory comprising computer-executable instructions that, when executed by the processor, cause the user equipment to perform the following operations:
receiving at least one handover execution condition from a network node, wherein the at least one handover execution condition comprises at least one delta value with respect to at least one actual handover execution condition to allow for early and late execution of a handover by the user equipment;
receiving, from the network node, an indication of a transfer interval and a survival time for which the at least one handover execution condition is taken into account, wherein the indication further comprises a second indication of a range of handover margin/offset, a time-to-trigger, and a timer for a maximum allowed delay after the at least one handover execution condition is met, the indication further comprising a third indication indicating that before the handover execution condition is met, when remaining survival time headroom considering an interruption time of the handover reaches a certain threshold, early execution of the handover is to be triggered by the user equipment, wherein the triggering comprises checking for a minimum threshold of radio signal strength and quality to be met by a target network node that is a handover candidate for the early execution of the handover;
determining that the at least one handover execution condition is met;
determining that a survival time counter representing a number of transfer interval periods since a last successful reception of a packet is greater than a first threshold;
starting the timer based on the at least one handover execution condition being met and the survival time counter representing the number of transfer interval periods since the last successful reception of the packet is greater than a first threshold, wherein the first threshold indicates that at least one packet is currently lost and it is recommendable to wait for a next packet to be received successfully;
based on determining that the survival time counter reaches a second threshold while the timer is running and there is still no successful reception of the next packet, initiate executing the handover without waiting for expiry of the timer;
during execution of the handover, when a plurality of target network nodes satisfies the handover condition, using the indicated survival time headroom supported by the target network node to select a best target network node for executing the handover by:
based on the survival time headroom exceeding a threshold that is configured by the target network node, canceling the handover with the target network node;
receiving, from the target network node, a range of survival time headroom the target network node can support;
select a new target network node from the plurality of target network nodes that supports a define number of maximum survival time packets transfer interval with a certain number range of packets transfer interval headroom for a request quality of service by the user equipment; and
execute the handover with the new target network node.

14. The system of claim 13, wherein, after successful reception of the next packet, resetting the survival time counter and executing the handover.

15. The system of claim 14, wherein the computer-executable instructions, when executed by the processor, further cause the user equipment to perform the following operation:
receiving, from the network node, parameters indicating a minimum target cell threshold for early execution of the handover and a minimum source cell threshold for late execution of the handover.

16. The system of claim 15, wherein the computer-executable instructions, when executed by the processor, further cause the user equipment to perform the following operation:
monitoring a survival time buffer and expected time of a next packet transmission to advance and delay the handover execution within a range of the at least one delta value provided by the network node.

17. The system of claim 16, wherein the computer-executable instructions, when executed by the processor, further cause the user equipment to perform the following operation:
receiving, at the user equipment, an indication of survival time headroom supported by at least one target network node for handover.

18. The system of claim 17, wherein the computer-executable instructions, when executed by the processor, further cause the user equipment to perform the following operations:
receiving a configuration for a measurement event threshold; and
when the indicated survival time headroom exceeds the measurement event threshold, triggering a measurement by the user equipment.

* * * * *